(12) United States Patent
Saran et al.

(10) Patent No.: US 11,941,818 B1
(45) Date of Patent: Mar. 26, 2024

(54) EDGE LOCATOR

(71) Applicant: Apple Inc., Cupertino, CA (US)

(72) Inventors: Vedant Saran, Campbell, CA (US); Alexandre Da Veiga, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 345 days.

(21) Appl. No.: 17/190,969

(22) Filed: Mar. 3, 2021

Related U.S. Application Data

(60) Provisional application No. 62/990,511, filed on Mar. 17, 2020.

(51) Int. Cl.
*G06T 7/13* (2017.01)
*G06T 7/50* (2017.01)
*G06T 7/70* (2017.01)

(52) U.S. Cl.
CPC .............. *G06T 7/13* (2017.01); *G06T 7/50* (2017.01); *G06T 7/70* (2017.01)

(58) Field of Classification Search
CPC ............ G06T 7/13; G06T 7/50; G06T 7/70
USPC ........................................................ 382/103
See application file for complete search history.

(56) References Cited

U.S. PATENT DOCUMENTS

| | | | |
|---|---|---|---|
| 9,412,040 B2 * | 8/2016 | Feng | G06T 7/187 |
| 10,373,380 B2 | 8/2019 | Kutliroff et al. | |
| 2018/0322697 A1 * | 11/2018 | Hendrey | A63F 13/577 |
| 2019/0325588 A1 | 10/2019 | Saleemi et al. | |
| 2019/0385285 A1 * | 12/2019 | Chen | G06T 7/33 |

OTHER PUBLICATIONS

Ni, Huan; Lin, Xiangguo, Ning, Xiaogang and Zhang, Jixian; "Edge Detection and Feature Line Tracing in 3D-Point Clouds by Analyzing Geometric Properties of Neighborhoods", pp. 1-20, Sep. 1, 2016.

* cited by examiner

*Primary Examiner* — Ayodeji O Ayotunde
(74) *Attorney, Agent, or Firm* — Thompson Hine LLP

(57) ABSTRACT

Various implementations disclosed herein include devices, systems, and methods that determine a 3D location of an edge based on image and depth data. This involves determining a 2D location of a line segment corresponding to an edge of an object based on a light-intensity image, determining a 3D location of a plane based on depth values (e.g., based on sampling depth near the edge/on both sides of the edge and fitting a plane to the sampled points), and determining a 3D location of the line segment based on the plane (e.g., by projecting the line segment onto the plane). The devices, systems, and methods may involve classifying an edge as a particular edge type (e.g., fold, cliff, plane) and detecting the edge based on such classification.

20 Claims, 5 Drawing Sheets

EDGE LOCATOR

CROSS-REFERENCE TO RELATED APPLICATIONS

This application claims the benefit of U.S. Provisional Application Ser. No. 62/990,511 filed Mar. 17, 2020, which is incorporated herein in its entirety.

TECHNICAL FIELD

The present disclosure generally relates to the field of electronic devices, and, in particular, to systems, methods, and devices that detect physical characteristics such as edges in physical environments.

BACKGROUND

The ability to accurately detect the three-dimensional (3D) locations of edges in physical environments may facilitate measurements and numerous other applications. Existing technique for detecting edges based on light intensity (e.g., RGB) camera images of a physical environment may not provide desired levels of accuracy and efficiency. Moreover, existing edge detection techniques may fail to provide sufficiently accurate and efficient edge locations in real-time circumstances in which there is a need for fast edge location detection.

SUMMARY

Various implementations disclosed herein include devices, systems, and methods that determine a 3D location of an edge based on image and depth data. This may involve determining a 2D location of a line segment corresponding to an edge of an object based on a light-intensity image, determining a 3D location of a plane based on depth values (e.g., based on sampling depth near the edge/on both sides of the edge and fitting a plane to the sampled points), and determining a 3D location of the line segment based on the plane (e.g., by projecting the line segment onto the plane). The devices, systems, and methods may involve classifying an edge as a particular edge type (e.g., fold, cliff, plane) and detecting the edge based on such classification. Numerous user interface (UI) and other features may be provided based on the 3D location of the edge, for example, by enabling the snapping (e.g., automatic movement) of a graphical indictor to an edge or orthogonal to an edge.

Some implementations of this disclosure involve an exemplary method of determining a 3D location of an edge based on image and depth data. The exemplary method involves, at a device having a processor, determining a two-dimensional (2D) location of a line segment corresponding to an edge of an object in a physical environment. In some implementations, the 2D location of the line segment is determined based on a light-intensity image (e.g., an RGB image) of the physical environment.

The method further determines a 3D location of a plane associated with the edge of the object. In some implementations, the 3D location of the plane is determined based on depth values obtained via a depth sensor. For example, a depth sensor may provide depth data that provides, or is used to generate, the depth values. Depth values may be provided in an image of pixels that are associated with/spatially aligned with pixels of the light-intensity image. In some implementations, determining the plane involves sampling depth values within a predetermined distance of the edge/on both sides of the edge and fitting a plane to the sampled depth values. In some implementations, heuristics are used to determine how far away from the edge to sample the depth values. In some implementations, heuristics are used to determine the 3D location of the plane in a way that accounts for noisy data. For example, such heuristics may account for not all points on a table top being on a plane due to a coffee cup or other physical objects on the table top.

The method determines a 3D location of the line segment based on the 3D location of the plane. In some implementations, this involves projecting the line segment onto the plane, e.g., by determining the nearest location on a plane at which the line segment can be positioned. Determining whether the line segment should be identified as an edge and/or where a line segment should be located may depend upon a classification. In some implementations, a line segment/edge may be classified as one of multiple types (e.g. cliff edge, plane edge, or fold edge) and such classification used to determine how to treat the line segment/edge. For example, plane edges may not be identified as edges for certain application/user interface purposes, cliff edges may be associated and positioned based on a single plane for certain application/user interface purposes, and fold edges may be associated with and positioned based on 2 planes for certain application/user interface purposes.

In some implementations, a user interface may position a graphical indicator based on the 3D location of the line segment/edge. For example, a user interface may determine that a current position indicator/graphical selector is within a predetermined distance of an edge and, based on this, reposition the indicator/graphical selector onto the edge. In some implementations, a user interface facilitates the identification of start and/or end points for measurements. A user interface may display a graphical indicator to indicate a start or end position of a measurement. In some implementations, in response to a selection of a start position, a second graphical indicator is displayed to indicate the start position on the line segment and a third graphical indicator is automatically positioned to indicate a measurement direction and/or end position of the measurement. In one example, the third graphical indicator is automatically positioned and indicates the 3D location of a portion of the line segment starting at the start position and extending in a direction of the line segment to an end position, the end position based on a current position of the graphical indicator. In another example, the third graphical indicator is automatically positioned and indicates the 3D location of a portion of the line segment starting at the start position and extending in a direction orthogonal to a direction of the line segment to an end position, the end position based on a current position of the graphical indicator.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
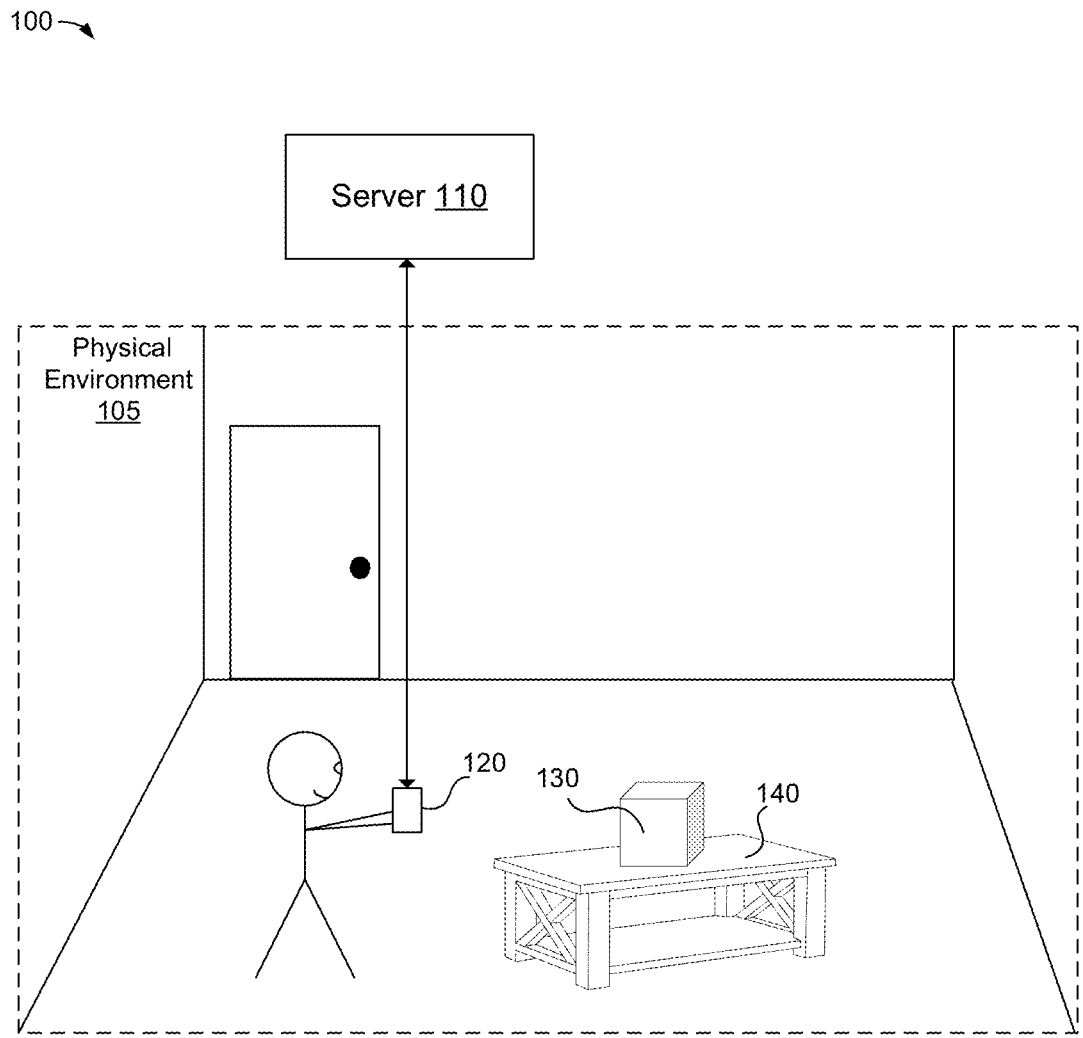
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 is a block diagram of an example operating environment 100 in accordance with some implementations. In this example, the example operating environment 100 illustrates an example physical environment 105 that includes an object 130 and a table 140. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a server 110 and a device 120. In an exemplary implementation, the operating environment 100 does not include a server 110, and the methods described herein are performed on the device 120.

In some implementations, the server 110 is configured to manage and coordinate an experience for the user. In some implementations, the server 110 includes a suitable combination of software, firmware, and/or hardware. The server 110 is described in greater detail below with respect to FIG. 2. In some implementations, the server 110 is a computing device that is local or remote relative to the physical environment 105. In one example, the server 110 is a local server located within the physical environment 105. In another example, the server 110 is a remote server located outside of the physical environment 105 (e.g., a cloud server, central server, etc.). In some implementations, the server 110 is communicatively coupled with the device 120 via one or more wired or wireless communication channels (e.g., BLUETOOTH, IEEE 802.11x, IEEE 802.16x, IEEE 802.3x, etc.).

In some implementations, the device 120 is configured to present an environment to the user. In some implementations, the device 120 includes a suitable combination of software, firmware, and/or hardware. The device 120 is described in greater detail below with respect to FIG. 3. In some implementations, the functionalities of the server 110 are provided by and/or combined with the device 120.

In some implementations, the device 120 is a handheld electronic device (e.g., a smartphone or a tablet) configured to present content to the user. In some implementations, the user 102 wears the device 120 on his/her head.

Figure 2:
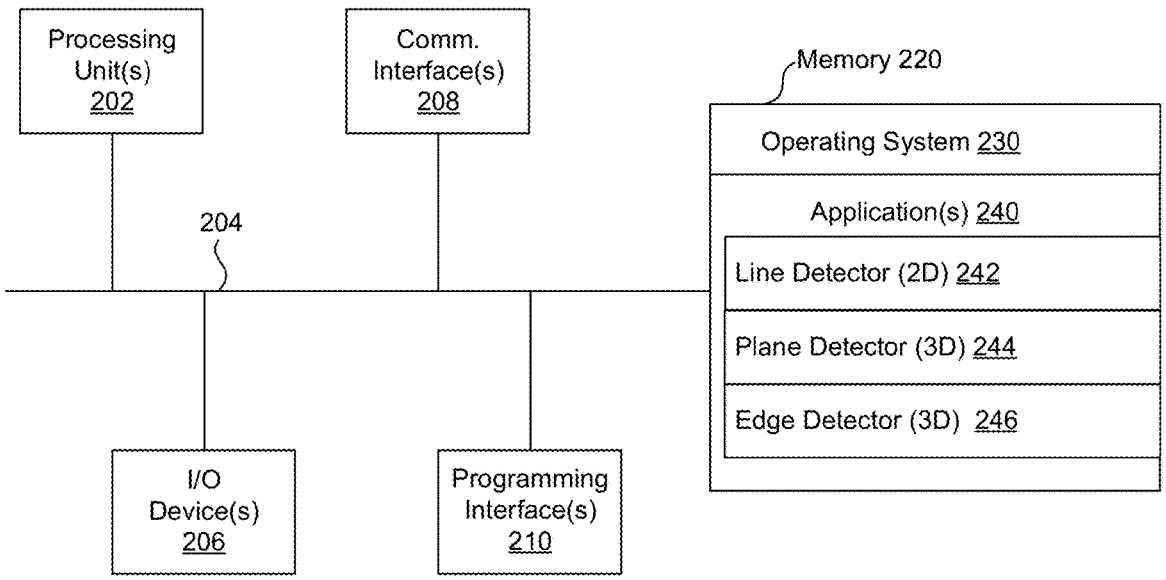
FIG. 2 is a block diagram of an example server in accordance with some implementations.

FIG. 2 is a block diagram of an example of the server 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the server 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 includes a non-transitory computer readable storage medium. In some implementations, the memory 220 or the non-transitory computer readable storage medium of the memory 220 stores the following programs, modules and data structures, or a subset thereof including an optional operating system 230 and one or more applications 240.

The operating system 230 includes procedures for handling various basic system services and for performing hardware dependent tasks. In some implementations, the applications 240 are configured to manage and coordinate one or more experiences for one or more users (e.g., a single experience for one or more users, or multiple experiences for respective groups of one or more users).

The applications 240 include a line detector (2D) 242, a plane detector (3D) 244, and edge detector (3D) 246. Applications 240 may be combined into a single application or unit or separated into one or more discrete applications or units.

The line detector (2D) 242 is configured with instructions executable by a processor to obtain sensor data (e.g., image data, depth data, motion data, etc.) determine a two-dimensional (2D) location of a line segment corresponding to an edge of an object in a physical environment. In some implementations, the 2D location of the line segment is determined based on a light-intensity image (e.g., an RGB image) of the physical environment.

The plane detector (3D) 244 is configured with instructions executable by a processor to determine a 3D location of a plane associated with the edge. In some implementations, the 3D location of the plane is determined based on depth values obtained via a depth sensor. For example, a depth sensor may provide depth data that provides or is used to generate the depth values. Depth values may be provided in an image of pixels that are associated with/spatially aligned with pixels of a light-intensity image of the physical environment, e.g., an image used to locate the line segment by line detector (2D) 242. In some implementations, determining the plane involves sampling depth values within a predetermined distance of the edge/on both sides of the edge and fitting a plane to the sampled depth values. In some implementations, heuristics are used to determine how far away from the edge to sample the depth values. In some implementations, heuristics are used to determine the 3D location of the plane in a way that accounts for noisy data. For example, such heuristics may account for not all points on a table top being on a plane due to a coffee cup or other physical objects on the table top.

The edge detector (3D) 246 is configured with instructions executable by a processor to determine a 3D location of an edge by determining a 3D location of the line segment based on the 3D location of the plane. In some implementations, this involves projecting the line segment onto the plane, e.g., by determining the nearest location on a plane which the line segment can be positioned. Determining whether the line segment should be identified as an edge and/or where a line segment should be located may depend upon a classification of the line segment. In some implementations, a line segment may be classified as one of a multiple edge types (e.g. cliff edge, plane edge, fold edge) and such classification used to determine how to treat the line segment. For example, plane edges may not be identified as edges for user interface purposes, cliff edges may be associated and positioned based on a single plane for user interface purposes, and fold edges may be associated with and positioned based on 2 planes for user interface purposes.

Although these elements are shown as residing on a single device (e.g., the server 110), it should be understood that in other implementations, any combination of the elements may be located in separate computing devices. Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
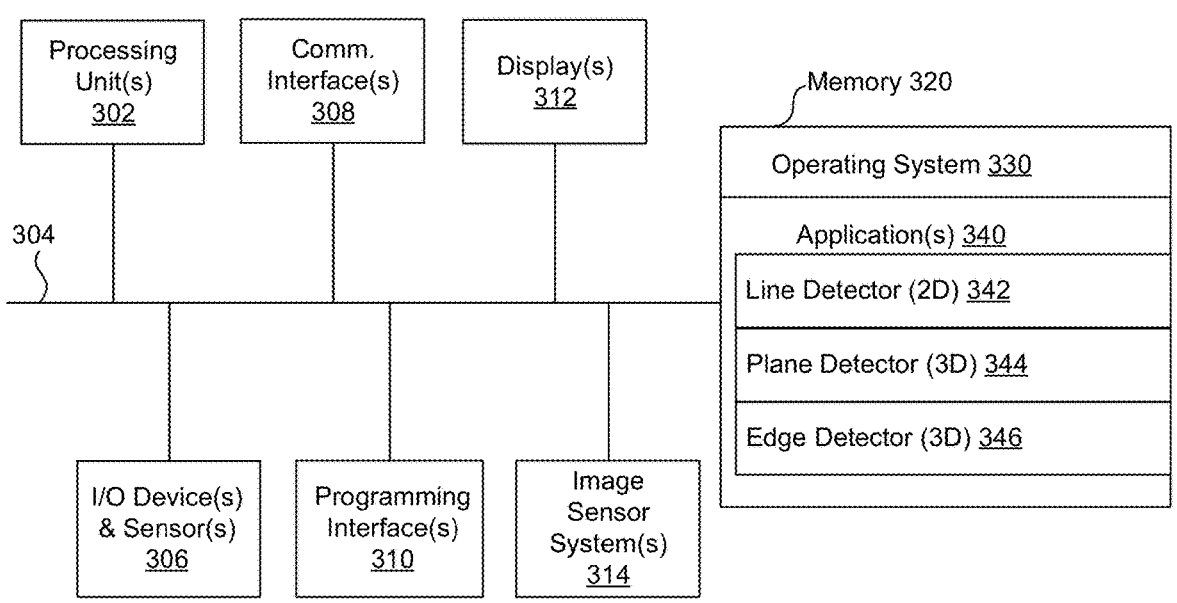
FIG. 3 is a block diagram of an example device in accordance with some implementations.

FIG. 3 is a block diagram of an example of the device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 310, one or more AR/VR displays 312, one or more interior and/or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, an ambient light sensor (ALS), one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 312 are configured to present the experience to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 312 correspond to diffractive, reflective, polarized, holographic, etc. waveguide displays. For example, the device 120 includes a single display. In another example, the device 120 includes a display for each eye of the user.

In some implementations, the one or more image sensor systems 314 are configured to obtain image data that corresponds to at least a portion of the physical environment 105. For example, the one or more image sensor systems 314 include one or more RGB cameras (e.g., with a complimentary metal-oxide-semiconductor (CMOS) image sensor or a charge-coupled device (CCD) image sensor), monochrome cameras, IR cameras, event-based cameras, and/or the like. In various implementations, the one or more image sensor systems 314 further include illumination sources that emit light, such as a flash. In various implementations, the one or more image sensor systems 314 further include an on-camera image signal processor (ISP) configured to execute a plurality of processing operations on the image data including at least a portion of the processes and techniques described herein.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 includes a non-transitory computer readable storage medium. In some implementations, the memory 320 or the non-transitory computer readable storage medium of the memory 320 stores the following programs, modules and data structures, or a subset thereof including an optional operating system 330 and one or more applications 340.

The operating system 330 includes procedures for handling various basic system services and for performing hardware dependent tasks. In some implementations, the applications 340 are configured to manage and coordinate one or more experiences for one or more users (e.g., a single experience for one or more users, or multiple experiences for respective groups of one or more users).

The applications 340 include a line detector (2D) 342, a plane detector (3D) 344, and edge detector (3D) 346. Applications 340 may be combined into a single application or unit or separated into one or more discrete applications or units.

The line detector (2D) 342 is configured with instructions executable by a processor to obtain sensor data (e.g., image data, depth data, motion data, etc.) determine a two-dimensional (2D) location of a line segment corresponding to an edge of an object in a physical environment. In some implementations, the 2D location of the line segment is determined based on a light-intensity image (e.g., an RGB image) of the physical environment.

The plane detector (3D) 344 is configured with instructions executable by a processor to determine a 3D location of a plane associated with the edge. In some implementations, the 3D location of the plane is determined based on depth values obtained via a depth sensor. For example, a depth sensor may provide depth data that provides or is used to generate the depth values. Depth values may be provided in an image of pixels that are associated with/spatially aligned with pixels of a light-intensity image of the physical environment, e.g., an image used to locate the line segment by line detector (2D) 342. In some implementations, determining the plane involves sampling depth values within a predetermined distance of the edge/on both sides of the edge and fitting a plane to the sampled depth values. In some implementations, heuristics are used to determine how far away from the edge to sample the depth values. In some implementations, heuristics are used to determine the 3D location of the plane in a way that accounts for noisy data. For example, such heuristics may account for not all points on a table top being on a plane due to a coffee cup or other physical objects on the table top.

The edge detector (3D) 346 is configured with instructions executable by a processor to determine a 3D location of an edge by determining a 3D location of the line segment based on the 3D location of the plane. In some implementations, this involves projecting the line segment onto the plane, e.g., by determining the nearest location on a plane which the line segment can be positioned. Determining whether the line segment should be identified as an edge and/or where a line segment should be located may depend upon a classification of the line segment. In some implementations, a line segment may be classified as one of a multiple edge types (e.g. cliff edge, plane edge, fold edge) and such classification used to determine how to treat the line segment. For example, plane edges may not be identified as edges for user interface purposes, cliff edges may be associated and positioned based on a single plane for user interface purposes, and fold edges may be associated with and positioned based on 2 planes for user interface purposes.

Although these elements are shown as residing on a single device (e.g., the device 120), it should be understood that in other implementations, any combination of the elements may be located in separate computing devices. Moreover, FIG. 3 is intended more as functional description of the various features which are present in a particular implementation as opposed to a structural schematic of the implementations described herein. As recognized by those of ordinary skill in the art, items shown separately could be combined and some items could be separated. For example, some functional modules (e.g., applications 340) shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
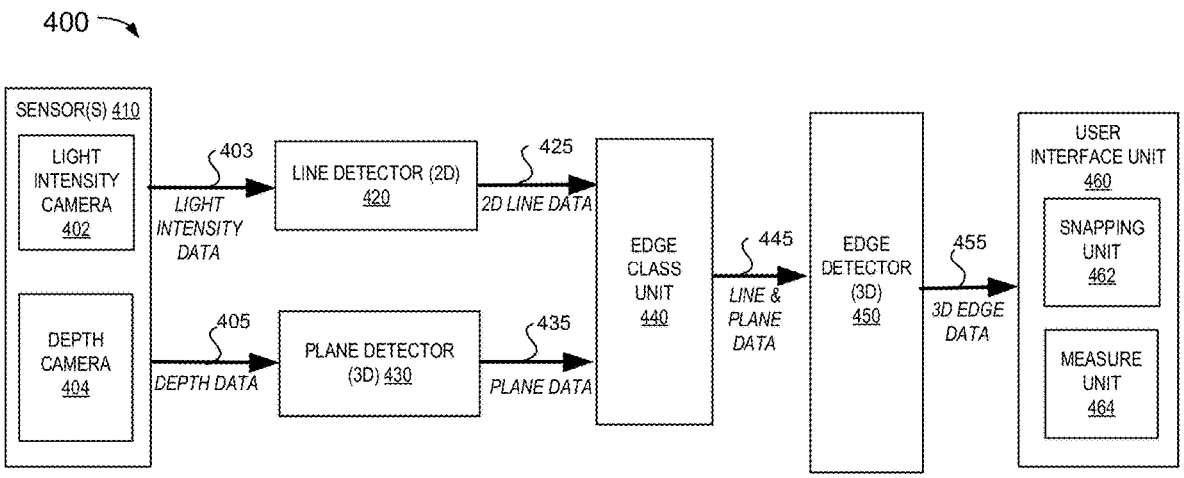
FIG. 4 is a system flow diagram of an example edge detection process according to some implementations.

FIG. 4 is a system flow diagram of an example environment 400 in which an edge is detected based on sensor data and used to provide a user interface of a measurement application. In some implementations, the system flow of the example environment 400 is performed on a device (e.g., server 110 or device 120 of FIGS. 1-3), such as a mobile device, desktop, laptop, or server device. In some implementations, the system flow of the example environment 400 is performed on processing logic, including hardware, firmware, software, or a combination thereof. In some implementations, the system flow of the example environment 400 is performed on a processor executing code stored in a non-transitory computer-readable medium (e.g., a memory).

The system flow of the example environment 400 acquires, utilizing a plurality of sensor(s) 410, light intensity image data 403 (e.g., from a live camera feed that provides RGB images from light intensity camera 402) and depth image data 405 (e.g., depth image data from depth camera 404) from a physical environment (e.g., the physical environment 105 of FIG. 1). In an example implementation, the environment 400 includes an image composition pipeline that acquires or obtains data (e.g., image data from image source(s), motion data, etc.) for the physical environment. Example environment 400 is an example of acquiring sensor data (e.g., light intensity data and depth data) for a plurality of instants in times or frames. For example, such sensor data may be obtained as a user is walking around a room acquiring sensor data from sensor(s) 410. The image source(s) may include a light intensity camera 402 (e.g., RGB camera) that acquires light intensity image data 403 (e.g., a sequence of RGB image frames), a depth camera 404 that acquires depth data 405, a motion sensor (not shown) that acquires motion data (not shown), and/or any other a sensor appropriate for a particular implementation.

The line detector (2D) 420, in this example, receives the light intensity data 403 and produces 2D line data 425 identifying a location of a line segment in a 2D image. For example, the location of a line segment may be identified on a light intensity image of the physical environment by identifying the pixel locations of the start and end of the line segment, or by identifying a pixel location and direction of a line segment.

The plane detector (3D) uses the depth data 405 to determine plane data 435 identifying a 3D location of a plane. In some implementations, the light intensity data 403 is used in addition to or as an alternative to the depth data 405 to determine the 3D location of the plane. Depth data 405 may be provided in an image of pixels that are associated with/spatially aligned with pixels of a light-intensity image of the light intensity data 403. In some implementations, determining the plane involves sampling depth values within a predetermined distance of the line segment and fitting a plane to the sampled depth values.

The edge class unit 440 determines an edge class of a line segment identified in the 2D line data 425 based on nearby planes identified in the plane data 435. The classification of line segment representing an edge as a particular edge type (e.g., fold, cliff, plane) may be based on the number of planes adjacent to the line segment and the orientations of such planes. For example, an edge having a single plane adjacent to it may be considered a cliff type edge. In another example, an edge having two planes adjacent to adjacent to it may be considered a fold type edge where such planes have dissimilar normal directions. In another example, an edge having two planes adjacent to adjacent to it may be considered a plane type edge where such edges have similar normal directions.

The edge detector uses the line and plane data 445 (e.g., the 2D line data 425, the plane data 435, and/or edge classifications) to identify 3D edge data 455 that includes the 3D locations of line segments corresponding to edges in the physical environment. This may involve projecting the line segment onto one or more of the planes that are associated with the line segment.

The 3D edge data 455 may be used for a variety of purposes. In the example of FIG. 4, the 3D edge data is used by a user interface unit 460 that provides features for making measurements in a physical environment. The user interface unit 460 provides user interface which includes a measure unit that uses a graphical indicator/selector such as a cursor to enable a user to select start and end positions of a measurement. For example, the measure unit 464 may use light intensity data 403 to display an image (or a live feed of video images) of the physical environment with a graphical selector overlaid thereon. A user may see the graphical selector overlaid upon a start/end point of interest (e.g., an edge of a couch arm), reposition the graphical selector (e.g., by moving the device to change the image or providing repositioning input) and provide selection input to select the point as the start or end point of a measurement. Given a selection or automatic identification of both a start point and an end point, the measure unit 464 determines the distance between the points in the 3D coordinate system. This may involve identifying corresponding 3D coordinates of the start point and end point.

In this example, the user interface unit 460 also includes a snapping unit 462 that facilitates the user experience, for example, facilitating automatic positioning of the graphical selector on an edge to facilitate easier measurements. In some implementations, the snapping unit 462 automatically repositions the graphical indicator onto the line segment associated with an edge based on detecting that the graphical indicator is within a predetermined distance (in 2D or 3D) of the line segment. This may improve the user experience of selecting points on edges as end points of a measurement, without requiring the user to manually precisely position the graphical indicator on the edge.

Figure 5:
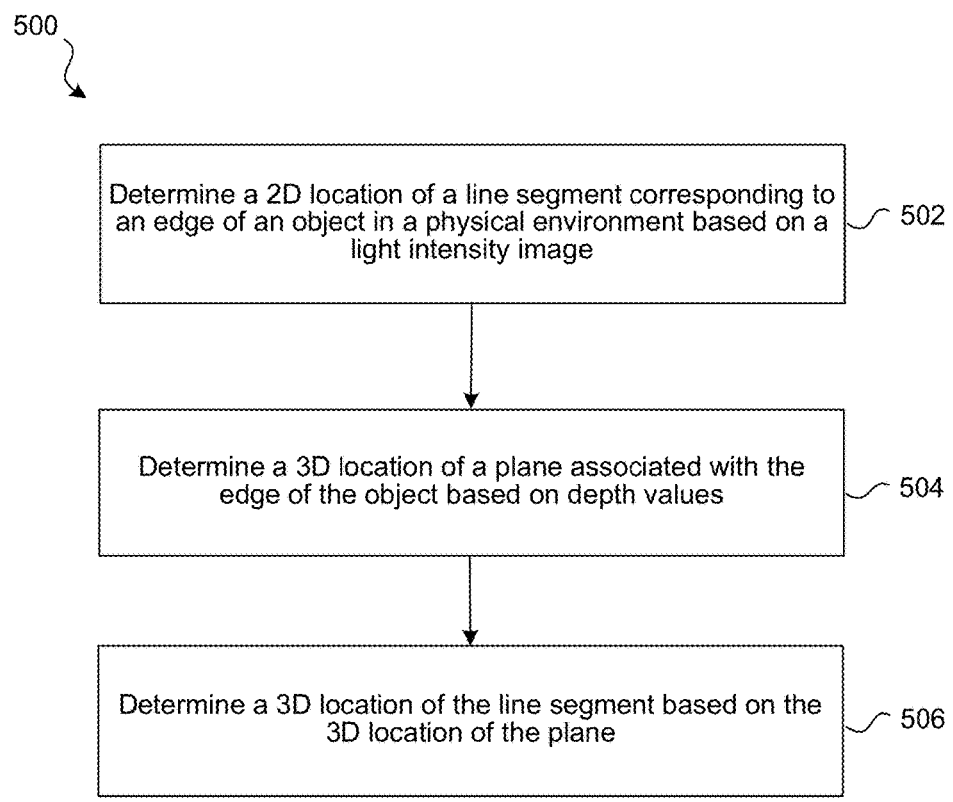
FIG. 5 is a flowchart representation of an exemplary method that determines a 3D location of a line segment corresponding to an edge in a physical environment in accordance with some implementations.

FIG. 5 is a flowchart representation of an exemplary method 500 that determines a 3D location of a line segment corresponding to an edge in a physical environment in accordance with some implementations. In some implementations, the method 500 is performed by a device (e.g., server 110 or device 120 of FIGS. 1-3), such as a mobile device, desktop, laptop, or server device. The method 500 can be performed on a device (e.g., device 120 of FIGS. 1 and 3) that has a screen for displaying images. In some implementations, the method 500 is performed by processing logic, including hardware, firmware, software, or a combination thereof. In some implementations, the method 500 is performed by a processor executing code stored in a non-transitory computer-readable medium (e.g., a memory).

At block 502, the method 500 determines a 2D location of a line segment corresponding to an edge of an object in a physical environment based on a light intensity image. In some implementations, the 2D location of the line segment is determined based on a light-intensity image (e.g., an RGB image) of the physical environment.

At block 504, the method 500 determines a 3D location of a plane associated with the edge of the object based on depth values. In some implementations, the 3D location of the plane is determined based on depth values obtained via a depth sensor. For example, a depth sensor may provide depth data that provides or is used to generate the depth values. The depth values (e.g., a densified depth image) may be acquired by a depth sensor in a physical environment. The depth values may include points corresponding to distances of portions of the physical environment from a depth sensor. For example, the depth data may be a grid of sparse depth values, such as a 12×12 grid of 144 values of depth data. In some implementations, a device may include a depth camera that acquires a sparse set of depths and a densified depth image may be generated from the sparse depth data by extrapolating depth values for additional pixel positions. Depth values may be provided in an image of pixels that are associated with/spatially aligned with pixels of the light-intensity image.

In some implementations, initial plane estimates are determined from light intensity images of the physical environment and refined based on depth values.

In some implementations, determining the 3D location of the plane involves sampling depth values within a predetermined distance of the edge/on both sides of the edge and attempting to fit a plane to the sampled depth values. In some implementations, heuristics are used to determine how far away from the edge to sample the depth values. For example, the heuristics may account for the length of the line segment, the distance of the line segment and/or depth points, the number of available depth points, the source of the depth points, the confidence in the depth points, and/or other appropriate criteria.

In some implementations, heuristics are used to determine the 3D location of the plane in a way that accounts for noisy data. For example, such heuristics may account for not all points on a table top being on a plane due to a coffee cup or other physical objects on the table top. In one example, a plane is identified based on identifying that at least a predetermined percentage of depth points in an area are within a threshold distance of being on a possible plane. In another example, a clustering technique is used to distinguish between points to be included on a plane and points excluded as outliers.

At block 506, the method 500 determines a 3D location of the line segment based on the 3D location of the plane. In some implementations, the 3D location of the line segment represents the location of the edge for measurement or other user interface-based applications. In some implementations, the 3D location of the line segment is determined by projecting the line segment onto the plane, e.g., by determining the nearest location on a plane which the line segment can be positioned.

Determining whether the line segment should be identified as an edge and/or where a line segment should be located may depend upon a classification of the line segment. In some implementations, a line segment may be classified as one of a multiple edge types (e.g. cliff edge, plane edge, fold edge) and such classification used to determine how to treat the line segment. For example, plane edges may not be identified as edges for user interface purposes, cliff edges may be associated and positioned based on a single plane for user interface purposes, and fold edges may be associated with and positioned based on 2 planes for user interface purposes.

In some implementations a user interface may position a graphical indicator based on the 3D location of the line segment. For example, a user interface may determine that a current position indicator/graphical selector is within a predetermined distance of an edge and, based on this, reposition the indicator/graphical selector onto the edge. In some implementations, a user interface facilitates the identification of start and/or end points for measurements. A user interface may display a graphical indicator to indicate a start or end position of a measurement. In some implementations, in response to a selection of a start position a second graphical indicator is displayed to indicate the start position on the line segment and a third graphical indicator is automatically positioned to indicate a measurement direction and/or end position. In one example, the third graphical indicator is automatically positioned and indicates the 3D location of a portion of the line segment starting at the start position and extending in a direction of the line segment to an end position, the end position based on a current position of the graphical indicator. In another example, the third graphical indicator is automatically positioned and indicates the 3D location of a portion of the line segment starting at the start position and extending in a direction orthogonal to a direction of the line segment to an end position, the end position based on a current position of the graphical indicator.

Edge detection can facilitate selection of areas of interest in an image in numerous circumstances. In some implementations, a user holds a mobile device and views an image feed of the physical environment on the mobile device. As the user moves the device around in the physical environment, a graphical indicator may be overlaid on the image feed to enable the user to select points of interest. In some implementations, such a graphical indicator is automatically aligned with an edge of an object in the image based on the graphical indicators current position being proximate to the edge. The user may override this automatic placement in some implementations by shaking the device or providing another form of user input.

In some implementations, edges of objects in an image are detected by a mobile device with sufficient efficiency to provide graphical indicators on images in a live image feed. In some implementations, edges are detected without needing to perform a 3D reconstruction of the entire physical environment. For example, the locations of a line segment based on one or more planes without a 3D reconstruction of other portions of the physical environment.

Figure 6:
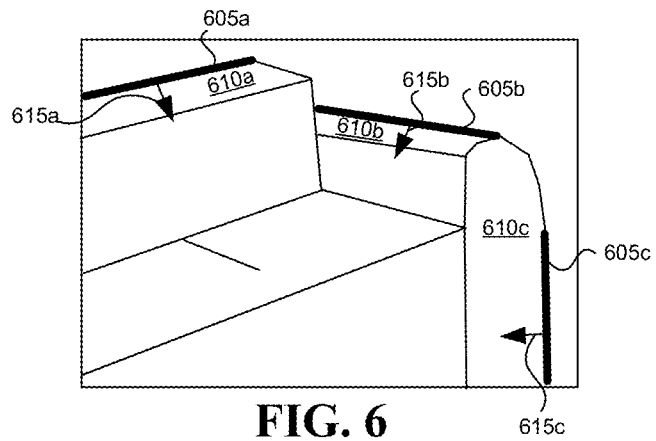
FIG. 6 is a block diagram illustrating cliff type edges detected in accordance with some implementations.

FIG. 6 is a block diagram illustrating cliff type edges detected in accordance with some implementations. In this example, edges 605a-c are identified based on analysis of a light intensity image of a physical environment. Additionally, depth values (and possible one or more images of the physical environment) are used to identify planes 610a-c. Based on determining that each of the edges 605a-c is adjacent to a single plane of planes 610a-c, these edges 605a-c are classified as "cliff" edges. Specifically, edge 605a is adjacent only to plane 610a, edge 605b is adjacent only to plane 610b, and edge 605c is adjacent only to plane 610c. Directions 615a-c perpendicular to edges 605a-c respectively are also determined.

Figure 7:
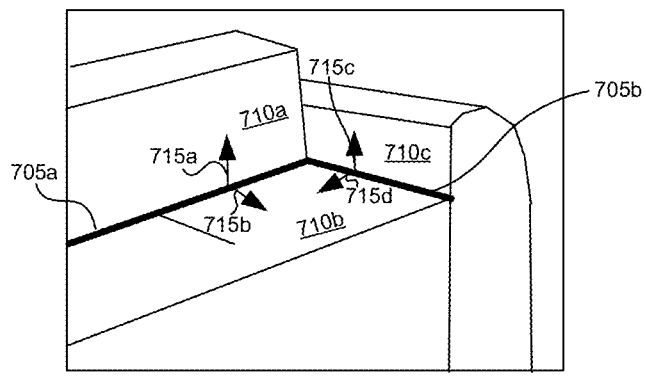
FIG. 7 is a block diagram illustrating fold type edges detected in accordance with some implementations.

FIG. 7 is a block diagram illustrating fold type edges detected in accordance with some implementations. In this example, edges 705a-b are identified based on analysis of a light intensity image of a physical environment. Additionally, depth values (and possible one or more images of the physical environment) are used to identify planes 710a-c. Based on determining that each of the edges 705a-b is adjacent to two planes of planes 710a-c and the two planes have sufficiently different normal directions, these edges 705a-b are classified as "fold" edges. Specifically, edge 705a is adjacent to plane 710a and plane 710b and edge 705b is adjacent to plane 710b, and edge 705b is adjacent only to plane 710c. Direction 715a perpendicular to edge 705a on plane 710a, direction 715b perpendicular to edge 705a on plane 710b, direction 715c perpendicular to edge 705b on plane 710c, and direction 715d perpendicular to edge 705b on plane 710b are also determined.

Figure 8:
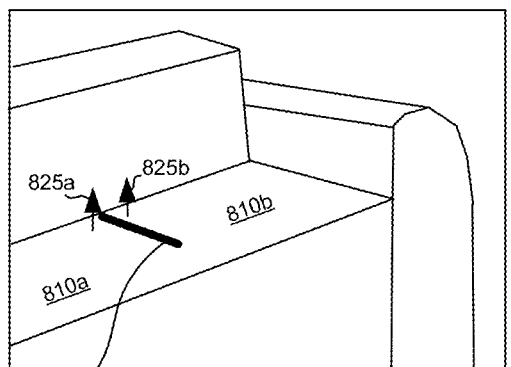
FIG. 8 is a block diagram illustrating a plane type edge detected in accordance with some implementations.

FIG. 8 is a block diagram illustrating a plane type edge detected in accordance with some implementations. In this example, edge 805a is identified based on analysis of a light intensity image of a physical environment. Additionally, depth values (and possible one or more images of the physical environment) are used to identify planes 810a-b. Based on determining that the edge 805a is adjacent on each of its sides to planes 810a and 810b respectively and the two planes having sufficiently similar normal directions 825a,b, the edge 805a is classified as a "plane" edge. Plane edges may correspond to edges created by shadows, writing, paintings, and other 2D lines. In some implementations, such as some measurement applications, plane edges are not used as edges for measurement purposes. Accordingly, in some implementations, a graphical indicator is adjusted based on detecting a cliff edge or a fold edge but not a plane edge.

Figure 9:
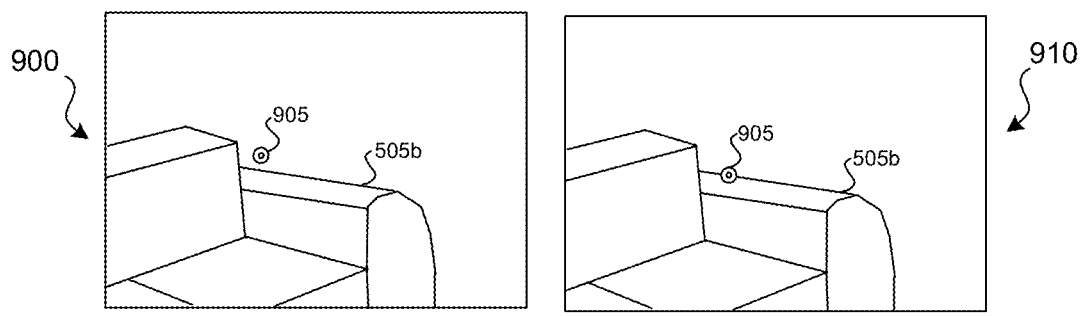
FIG. 9 is a block diagram illustrating automatic repositioning of a graphical indicator based on detecting an edge in accordance with some implementations.

FIG. 9 is a block diagram illustrating automatic repositioning of a graphical indicator based on detecting an edge. In this example, in depiction 900, a graphical indicator 905 is initial positioned at a location relative to an image of a physical environment. The initial position of the graphical indicator 905 may be based on the device's current pose (position and orientation) relative to the physical environment or some other form of user input. A 3D location of edge 505b is detected and this 3D position is used to automatically relocate the graphical indicator relative to the image of the physical environment. As shown in depiction 910, the graphical indicator is repositioned to be on the edge 505b.

Figure 10:
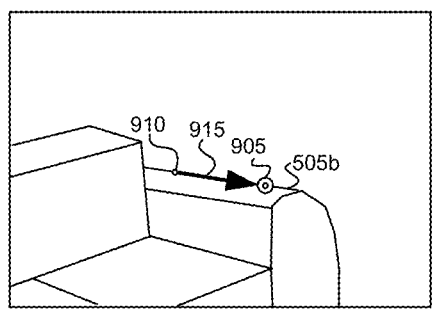
FIG. 10 is a block diagram illustrating the display of graphical indicators in a user interface to facilitate measurement in accordance with some implementations.

FIG. 10 is a block diagram illustrating the display of graphical indicators in a user interface to facilitate measurement. In this example, following a selection of point as a start point of a measurement, the graphical indicator 905 is repositioned as illustrated. The start point is identified by a graphical indicator 910 in the user interface. The current selection point is also indicated by a graphical indicator 905. Graphical indicator 905 may have been positioned based on movement of the device's pose (position and orientation) relative to the physical environment or some other form of user input, and/or may have been repositioned automatically based on a prediction of a user's intended measurement direction. The graphical indicator 905 may have been automatically repositioned onto the edge 505b based on its proximity to edge 505b. In this example, another graphical indicator 915 indicates a direction of measurement along edge 505b.

Figure 11:
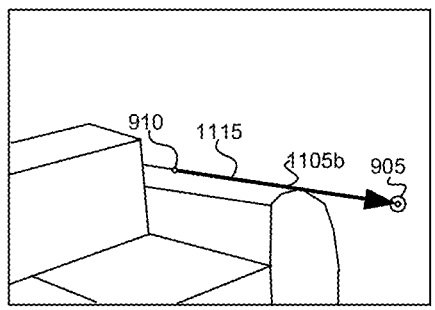
FIG. 11 is a block diagram illustrating the display of graphical indicators in a user interface to facilitate measurement in accordance with some implementations.

FIG. 11 is a block diagram illustrating the display of graphical indicators in a user interface to facilitate measurement. In this example, following a selection of point as a start point of a measurement, the graphical indicator 905 is repositioned as illustrated. The start point is identified by a graphical indicator 910 in the user interface. The current selection point is again also indicated by a graphical indicator 905. Graphical indicator 905 may have been positioned based on movement of the device's pose (position and orientation) relative to the physical environment or some other form of user input, and/or may have been repositioned automatically based on a prediction of a user's intended measurement direction. The graphical indicator 905 may have been automatically repositioned onto an extension 1105b of the edge based on its proximity to the extension 1105b of the edge. In this example, another graphical indicator 1115 indicates a direction of measurement along the extension 1105b of the edge.

Figure 12:
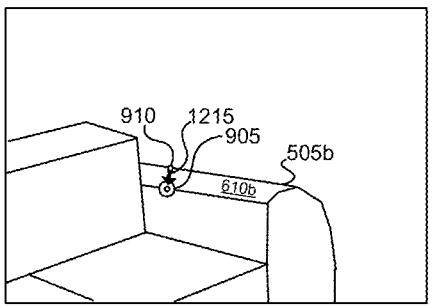
FIG. 12 is a block diagram illustrating the display of graphical indicators in a user interface to facilitate measurement in accordance with some implementations.

FIG. 12 is a block diagram illustrating the display of graphical indicators in a user interface to facilitate measurement in accordance with some implementations. In this example, following a selection of point as a start point of a measurement, the graphical indicator 905 is repositioned as illustrated. The start point is identified by a graphical indicator 910 in the user interface. The current selection point is also indicated by a graphical indicator 905. Graphical indicator 905 may have been positioned based on movement of the device's pose (position and orientation) relative to the physical environment or some other form of user input, and/or may have been repositioned automatically based on a prediction of a user's intended measurement direction. The graphical indicator 905 may have been automatically repositioned onto a line perpendicular to the edge on the associated plane 610b. In this example, another graphical indicator 1215 indicates a direction of measurement in the direction perpendicular to the edge on the associated plane 610b.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at a device having a processor:
      determining a two-dimensional (2D) location of a line segment corresponding to an edge of an object in a physical environment, the 2D location of the line segment determined based on a light-intensity image of the physical environment;
      determining a three-dimensional (3D) location of a plane associated with the edge of the object, the 3D location of the plane determined based on depth values obtained via a depth sensor; and
      determining a 3D location of the line segment based on the 3D location of the plane.

2. The method of claim 1, wherein determining the 3D location of the plane comprises:
   identifying the depth values based on spatial associated between the depth values and pixel locations in the light-intensity image relative to the 2D location of the line segment; and
   fitting the plane to the depth values.

3. The method of claim 1, wherein determining the 3D location of the line segment comprises projecting the line segment onto the plane.

4. The method of claim 1, further comprising displaying a graphical indicator in a user interface based on the 3D location of the line segment.

5. The method of claim 4, wherein the graphical indicator indicates a start or end position of a measurement.

6. The method of claim 5, wherein the method repositions the graphical indicator onto the line segment based on detecting that the graphical indicator is within a predetermined distance of the line segment.

7. The method of claim 1, wherein, in response to a selection of a start position:
   a second graphical indicator is displayed indicating the start position on the line segment; and
   a third graphical indicator is displayed indicating the 3D location of a portion of the line segment starting at the start position and extending in a direction of the line segment to an end position, the end position based on a current position of the graphical indicator.

8. The method of claim 1, wherein, in response to a selection of a start position:
   a second graphical indicator is displayed indicating the start position on the line segment; and
   a third graphical indicator is displayed indicating the 3D location of a portion of the line segment starting at the start position and extending in a direction orthogonal to a direction of the line segment to an end position, the end position based on a current position of the graphical indicator.

9. The method of claim 1, wherein the graphical indicator is a line extending beyond an end point of the line segment in a direction of the line segment.

10. The method of claim 5 further comprising determining to display the graphical indicator based on a type of the edge.

11. The method of claim 10, wherein the type of the edge is an edge associated with a single plane.

12. The method of claim 10, wherein the type of the edge is an edge associated with two planes, wherein normal directions of the two planes are used to determine that the two planes are associated with a single plane.

13. The method of claim 10, wherein the type of the edge is an edge associated with two planes, wherein normal directions of the two planes are used to determine that the two planes are associated with different planes.

14. A device comprising:
   a non-transitory computer-readable storage medium; and
   one or more processors coupled to the non-transitory computer-readable storage medium, wherein the non-transitory computer-readable storage medium comprises program instructions that, when executed on the one or more processors, cause the device to perform operations comprising:
      determining a two-dimensional (2D) location of a line segment corresponding to an edge of an object in a physical environment, the 2D location of the line segment determined based on a light-intensity image of the physical environment;
      determining a three-dimensional (3D) location of a plane associated with the edge of the object, the 3D location of the plane determined based on depth values obtained via a depth sensor; and
      determining a 3D location of the line segment based on the 3D location of the plane.

15. The device of claim 14, wherein determining the 3D location of the plane comprises:
   identifying the depth values based on spatial associated between the depth values and pixel locations in the light-intensity image relative to the 2D location of the line segment; and
   fitting the plane to the depth values.

16. The device of claim 14, wherein determining the 3D location of the line segment comprises projecting the line segment onto the plane.

17. The device of claim 14, further comprising displaying a graphical indicator in a user interface based on the 3D location of the line segment, wherein the graphical indicator indicates a start or end position of a measurement.

18. The device of claim 14, wherein, in response to a selection of a start position:

a second graphical indicator is displayed indicating the start position on the line segment; and a third graphical indicator is displayed indicating the 3D location of a portion of the line segment starting at the start position and extending in a direction of the line segment to an end position, the end position based on a current position of the graphical indicator.

19. The device of claim 14, wherein, in response to a selection of a start position:

a second graphical indicator is displayed indicating the start position on the line segment; and a third graphical indicator is displayed indicating the 3D location of a portion of the line segment starting at the start position and extending in a direction orthogonal to a direction of the line segment to an end position, the end position based on a current position of the graphical indicator.

20. A non-transitory computer-readable storage medium, storing computer-executable program instructions on a computer to perform operations comprising:

determining a two-dimensional (2D) location of a line segment corresponding to an edge of an object in a physical environment, the 2D location of the line segment determined based on a light-intensity image of the physical environment;

determining a three-dimensional (3D) location of a plane associated with the edge of the object, the 3D location of the plane determined based on depth values obtained via a depth sensor; and determining a 3D location of the line segment based on the 3D location of the plane.

* * * * *